United States Patent [19]

Nakanose

[11] 4,062,918
[45] Dec. 13, 1977

[54] METHOD FOR PRODUCING A PRINTED THERMOPLASTIC RESIN TAPE FOR PACKAGING

[76] Inventor: Tokumitsu Nakanose, 1-17, Ikoma-cho, Kita, Nagoya, Aichi, Japan

[21] Appl. No.: 667,835

[22] Filed: Mar. 17, 1976

[30] Foreign Application Priority Data

Mar. 20, 1975 Japan .................................. 50-33772

[51] Int. Cl.² ........................................... B29C 15/00
[52] U.S. Cl. ................................ 264/132; 264/210 R; 264/284
[58] Field of Search .................... 264/132, 210 R, 284

Primary Examiner—Richard R. Kucia
Attorney, Agent, or Firm—Fleit & Jacobson

[57] ABSTRACT

A thermoplastic resin tape on which a desired marks or the like are printed is formed and then is pressed by embossing rollers to effectively disorder the micelle particle arrangement in the resin tape.

5 Claims, 8 Drawing Figures

METHOD FOR PRODUCING A PRINTED THERMOPLASTIC RESIN TAPE FOR PACKAGING

BACKGROUND OF THE INVENTION

The present invention relates to a method for producing a tape or band for wrapping around packages wherein the tape is made of a thermoplastic resin, and is printed thereon, and is usually operated upon for packaging by a packaging machine.

Conventionally, packaging tapes with printings thereon have been produced by an extrusion method in which thermoplastic resin material is formed into a flat-surfaced tape and then the tape is treated with a printing device so as to print a desired figures and/or marks thereon.

However, it has been found that the conventional method has defects not only in that the tape itself presents a serious disadvantage but also in that one fails to obtain the desired printing. Specifically, when the packaging tape of thermoplastic resin materials is extruded and extended up to 5-7 times as long as the original length of the materials in the lengthwise direction, the micelle particle arrangement is produced within the resin materials in the lengthwise direction, thereby often producing objectionable cracks or splits in the lengthwise direction of the extruded resin material. Furthermore, it has been found that the printings on the tape are faded out during a packaging operation by a packaging machine, which will be described below, since the tape has a flat surface and moreover the tape is printed on the flat surface thereof.

Accordingly, an object of the present invention is to provide a new method for producing a thermoplastic resin packaging tape which has printings thereon, wherein the printing does not fade out or discolor but keeps the printings in a desired manner.

Another object of the present invention is to provide a new method for producing a packaging tape which is made of thermoplastic resin materials and has printings thereon, wherein the printed tape prevents the resin tape from cracking or splitting in the lengthwise direction.

According to the present invention, there is provided a method for producing a thermoplastic synthetic resin tape for packaging, comprising the steps of forming a tape, annealing the tape, printing the tape on the surface thereof, and pressing the tape to effectively disorder the micelle particle arrangement in the tape.

DETAILED DESCRIPTION OF THE INVENTION

Figure 1A:
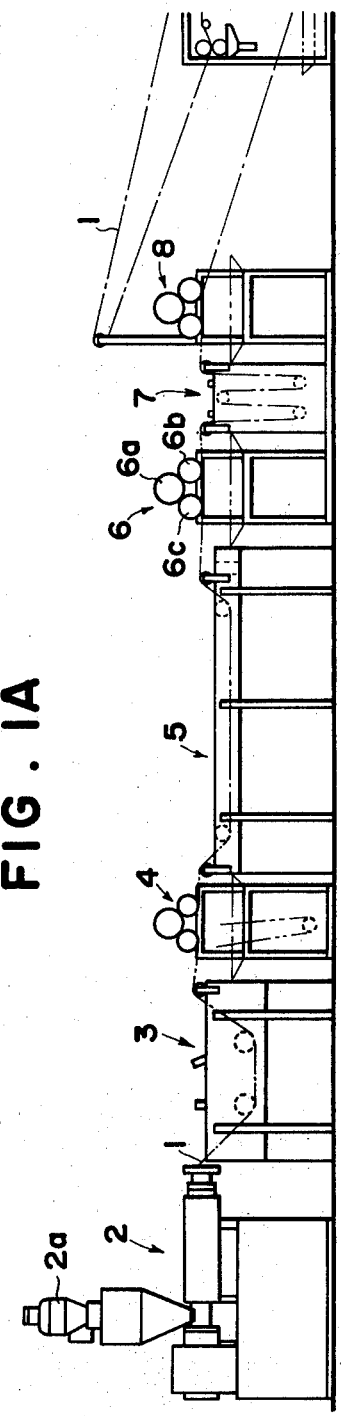
FIGS. 1a and 1b are schematic side views showing the continuous steps of a preferred embodiment of the present invention.
Figure 1B:
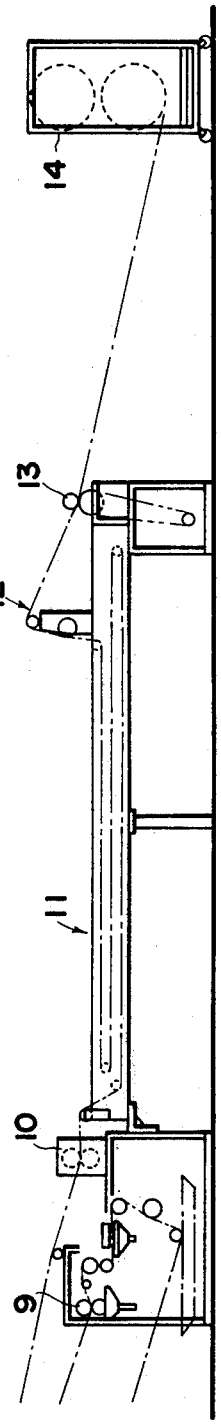

In FIGS. 1a and 1b which are explanatory schematic side views of the apparatus used in the process of the present invention, a thermoplastic synthetic resin material 1 which is produced by an extrusion device 2 having a hopper loader 2a in a known method, which will not be described herein since it is well known in the art, is fed to a first cooling device 3 such as a water tank. The water temperature of the first cooling device 3 is kept below 20° C since a tension of the extruded resin material which is sensitive to temperature is influenced by the temperature of the water tank. After the first cooling step, the extruded resin material 1 is fed to a first receiving device 4 having rollers as illustrated so that the cooled resin material may contain little water therein. Then, the resin material is fed to a heating device 5. The heating device 5 may be either of dry-type or of wet-type. However, in either type of the heating device a care must be taken that heating temperature should be kept about 95° - 100° C. In this instance, the resin material is in the form of a continuous band since the extruded resin material has been treated with the first receiving device 4 as described. The band-like resin material treated with the heating device 5 is then fed to, and treated with, a second receiving 6 device which is similar with the first receiving device 4 and has three rollers as illustrated. By the second receiving device 6 the band-like resin material 1 is pressed by the cooperation of the rollers 6a, 6b, 6c and is extended to an extent of 5 to 7 times longer than the original resin material. Thus, a tape of synthetic resin materials is produced. Then, the resin tape is fed to an annealing device 7 for the purpose of preventing the tape from objectionable shrinkage. The applicant of the present application has found that the objectionable shrinkage will occur when the tape is left as it is after the resin material is pressed and extended to an extent of 5-7 times by the second receiving device 6. This is due to the fact that the tape is formed by the 5-7 times extension as described above. Also, the applicant has found from his experiments that a resin tape as long as 1 meter generally shrinks to 0.92 meter when the tape is not treated by the annealing device 7. The annealing device 7 has temperature of 90° - 100° C, but preferably 97° - 99° C which, the applicant the found, is desirable for the purpose of preventing the above-stated shrinkage in the tape.

After the resin tape is treated with the annealing device, the tape is fed to a printing device 9 by way of a third receiving device 8. The printing device 9 has a printing roller having a desired letters figures and/or marks disposed thereon, which will be described below with reference to FIG. 2. By the printing device, desired letters, figures, and/or marks are printed on the surface of the resin tape. Then, the printed tape is fed to an embossment device 10 to form concavo-convex area on the surfaces of the tape to effectively disorder the micelle particle orientation of the tape so as to prevent an objectionable splitting from ocurring in the lengthwise direction of the tape. The embossment device 10 will be described below with reference to FIGS. 3A and 3B. After the printed tape is treated with the embossment device 10, the tape which has now concavo-convex area on the surfaces thereof is fed to a second cooling device 11 to completely cool the tape which still keeps rather higher temperature. The cooling device 11 keeps the temperature therein below 20° C.

Thus, the production of the desired tape on which desired marks, etc., are printed thereon is completed. Then, the tape is wound by a winding device 14 through a rotary water separator 12 and a pair of drawing rollers 13. As illustrated in the drawing, the steps described above are carried out continuously and sequentially.

Figure 2:
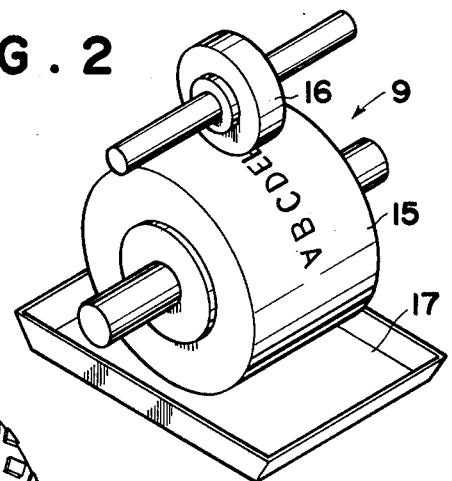
FIG. 2 is a perspective view of printing rollers of printing device applied for the process of the present invention.

In FIG. 2 which shows principal parts of the printing device 9, the device has a printing roller 15 which has desired letters, figures and/or marks carved thereon, a roller 16 above the printing roller 15 so that the resin tape may be tightly pressed by the roller 16 and fed between the two rollers 15, 16. The printing device 9 further comprises an ink vessel 17 below the printing roller 15 so that at least a rotary surface of the printing roller 15 may contact an ink contained in the ink vessel 17. The ink may be of any type but it may preferably be of immediate-drying type.

Figure 3A:
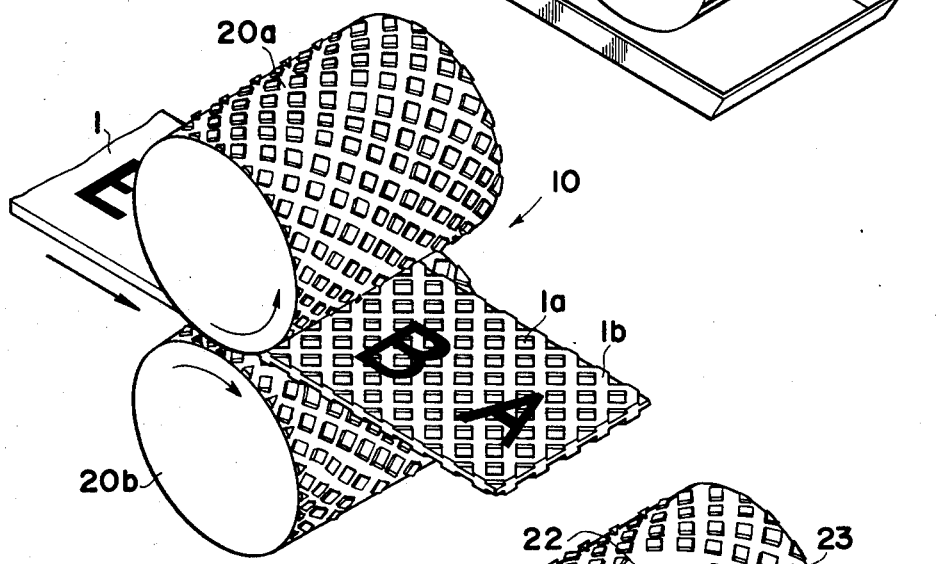
FIGS. 3A and 3B are perspective views of embossing rollers applied for the process of the present invention.
Figure 4:
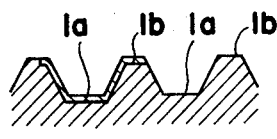
FIG. 4 is a sectioned view of a tape on which a desired figures or marks are printed.

In FIG. 3A, the synthetic resin tape 1 on which desired marks have been printed by the printing device 9 is delivered to the embossment device 10. The embossment device has embossing rollers 20a and 20b. As shown in FIG. 3A, the rollers 20a and 20b have concavo-convex portions, i.e., embossed area, or their entire rolling surfaces so that the tape may be embossed on the entire surfaces of the printed tape. As shown in FIG. 4, a printed portion of the concaved area 1a of the tape cannot be touched with workman's hands or the like. Thus, even though a printed portion of the convexed area 1b of the tape should fade away during an operation of packaging machine, which will be described below, or with hands, the printed portion of the concaved area 1a remains as it and is not faded away.

Figure 3B:
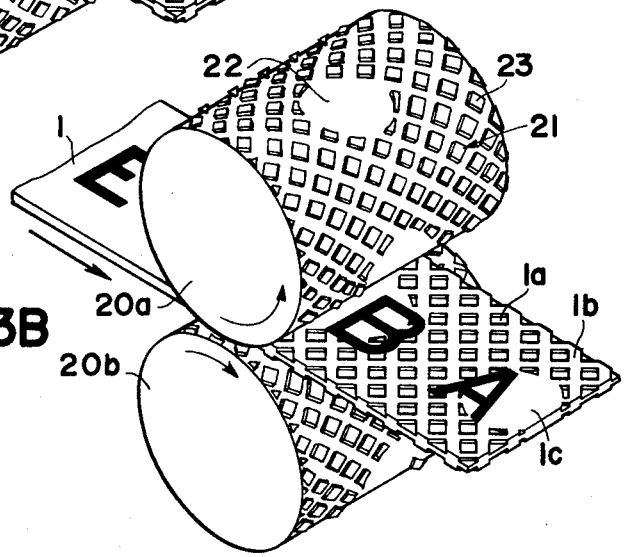

More preferably, from the view point of the characteristics of the tape, as illustrated in FIG. 3B, a thermoplastic synthetic resin tape 1 which is printed thereon is provided with a number of small indentations on the top and bottom surfaces thereof so that the tape has concavo-convex portions, which will be identified hereinafter as embossed portions 1a and 1b. The tape 1 is further provided on both surfaces thereof with a number of circular non concavo-convex portions, which will be identified hereinafter as non-embossed portions 1c. The non-embossed portions 1c occupy a relatively wide area on the tape 1 and are disposed at regular intervals on the central part of tape so that the non-embossed portions are aligned with one another and surrounded by the embossed portions as clearly shown in FIG. 3B. It is preferable that the total area occupied by the non-embossed portions 1c lies within the range of from 10% to 50% of the entire surface area of the tape 1. If the non-embossed portions 1c fall outside of the above-described range, either the desired rigidity cannot be obtained, or defective splittings will appear in the longitudinal direction of the tape. More specifically, if the non-embossed portions occupy an area less than about 10% of the whole tape area, a favorable rigidity in the tape will not be expected and a strain or flection will be produced on both sides of the tape; and if the non-embossed portions are more than about 50% of the entire surface area of the tape, prevention of cracking or splitting cannot be achieved due to the micelle particle arrangement in the thermoplastic synthetic resin material. Thus, it is important to have the non-embossed portions formed within the above-described range.

The printed thermoplastic resin tape 1 having a predetermined thickness and width is fed into the nip of a pair of embossing rollers 20a and 20b and pressed by the rollers. Both rollers 20a and 20b have a number of small studs on the surface thereof which form a concavo-convex area 21 on the rolling surface of the rollers. The rollers are further provided with relatively large non-embossing portions 22 on the rolling surfaces thereof so that the non-embossed portions are surrounded with the concavo-convex area 21. The total of the area of the non-embossed portions on the rollers should be within the range of 10-50% of the entire effective rolling surface of the rollers so as to form, on the tape, the non-embossed portions 3 which lie within the range 10-50% of entire surface of the tape as described before. The non-embossed portions 22 formed on the rollers 20a and 20b are of a circular shape and disposed at regular intervals on the rolling surfaces of the rollers, so that the non-embossed area 22 on each of the rollers are aligned with one another on the central portion of the rolling surface. The studs 23 each has a thickness which is at least as great as the thickness of the tape. The embossment rollers 20a and 20b are assembled in a known way such that the non-embossed portion of the roller 20a will be brought into alignment, and coincide with the non-embossed portion of the other roller 20b when the both rollers 20a and 20b are rotated so as to form the embossed and non-embossed portions on the base tape 1.

When both of the rollers 20a and 20b are rotated in opposite directions as illustrated by arrows in FIG. 3B, by a known driving mechanisms (not shown), the thermoplastic synthetic resin base tape 1a is fed into and pressed by the rollers 20a and 20b to continuously form the embossed portions 1a, 1b and non-embossed portions 1c, and is continuously delivered at a speed of 70 m/min. in the direction shown by the straight arrow of FIG. 3. The pressure applied to the tape 1 by the two rollers 20a and 20b is about 3 kg. m². Thus, the tape 1 of the invention is produced by rotating the rollers 20a and 20b which have embossed areas 21 and non-embossed portions 22 at regular intervals.

In the packaging tape thus produced as described above, the non-embossed portions 1c are formed on the tape at regular intervals on the central area of the tape so that the non-embossed portions 1c are surrounded by the embossed portions 1a, 1b. The rollers 20a and 20b play a role not only to form the embossed and non-embossed portions but also to rearrange effectively the micelle particles to a more disorderly arrangement in the synthetic resin material of the tape 1 so as to prevent splitting in the longitudinal direction of the tape.

Figure 5A:
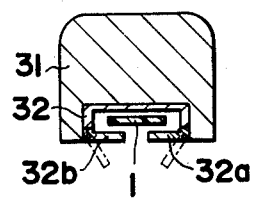
FIG. 5a is a vertical sectional view taken substantially along the plane of line V—V in FIG. 5.
Figure 5:
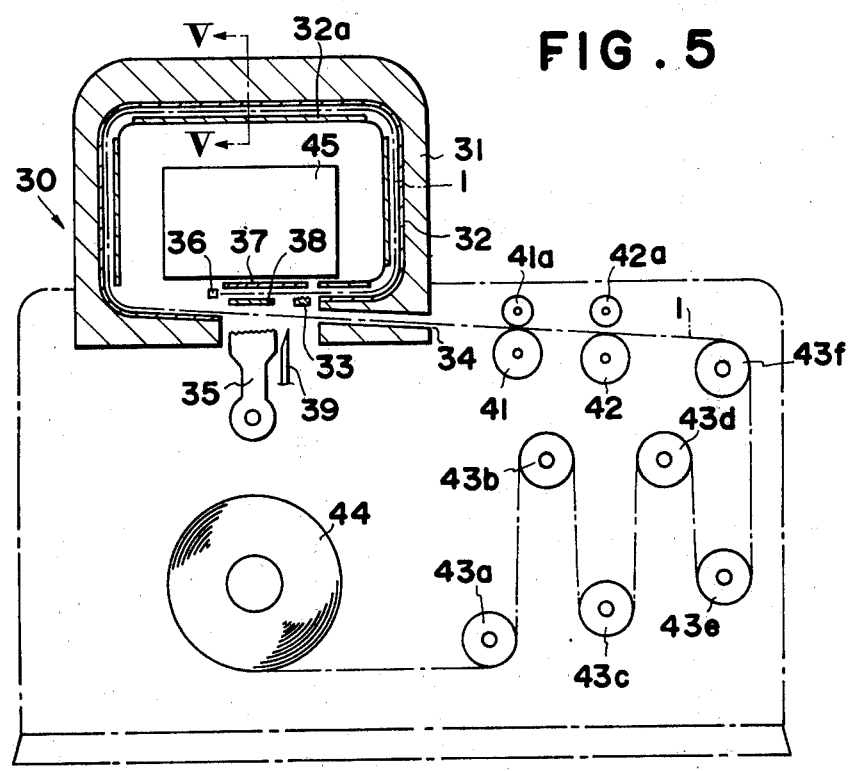
FIG. 5 is a schematic side view of a known packaging machine, showing a packaging operation.

A packaging operation will be described with reference to FIGS. 5 and 5A, the latter being a sectional view taken along V—V in FIG. 5, showing a general type of a packaging machine known per se. First the construction of the packaging machine will be explained. The packaging machine 30 has an arch-shaped fixed frame 31, a holding member 33, which is movable up and down, a clamping member 35, a limit switch 36, a movable metal plate 37, a heated plate 38 which is movable in the lateral direction, a cutter 39, a delivery roller 41, a rewinding roller 42, and a reel 44 on which the tape is wound. The limit switch 36 is electrically connected (not illustrated) to the delivery roller 41 and to the rewinding roller 42. Each of the rollers 41 and 42 has its own idler roller 41a and 42a respectively, which are disposed adjacent to an inlet 34 of the machine, the inlet 34 being in communication with a guide member which will be described with reference to FIG. 5A. As shown in FIG. 5A, the packaging machine further comprises, on the inner side of the arch-shaped fixed frame 31, a guide member 32 which has ledges 32a and 32b projecting in opposite directions toward each other. The guide member 32 is made of metal and is so formed that the ledges 32a and 32b are pivotable, as shown by the phantom lines in FIG. 5A, so that the tape 1 which is delivered within the guide member 32 can be forcibly removed from the guide member. The guide member may be of any shape or configuration provided that it can be removed therefrom by a pulling operation of the tape, the operation being described hereinafter.

With respect to a packaging operation, an article 45 to be packed is placed in position as shown in FIG. 5. The tape 1 is delivered within the guide member 32 from the reel 44 around the rollers 43a through 43f and the inlet, by driving the delivery roller 41. The guide member 32 is disposed on the inside surface of the fixed frame 31. When the leading end of the tape 1 is delivered through the guide member 32 to come to the predetermined position below the movable metal plate 37, the limit switch 36 is actuated to stop the rotation of the delivery roller 41, and to lift up the holding member 33 at the same time so as to firmly press or push the tape onto the movable metal plate 37 at the place adjacent to the leading end of the tape. Thus, the leading end portion of the tape is locked or grasped by the two members 33 and 37. After the leading end portion of the tape is locked, the delivery roller 41 and the free roller 41a are released and the rewinding roller 42 is driven so as to reverse the direction of the tape. When the tape is pulled by the reversing operation of the rewinding roller while the leading end portion of the tape is still locked, the tape is forcibly removed from the guide member 32. In this instance, the ledges 32a and 32b of the guide member are forcibly pivoted by the tape which has been pulled by the rewinding roller 42 as described above. The pivotal movement of the ledges are shown by the phantom lines in FIG. 5A. Continued operation of the rewinding roller 42 forces the tape 1 to come into contact with the article 45 so that the tape is wound tightly around the article 45.

After the tape is wound tightly around the article by the operation of the rewinding roller 42, the heat plate 38, which is heated by a heating device (not illustrated) is inserted below the leading end portion of the tape so that the heated plate 38 slightly touches the lower surface of the leading end portion and is positioned between and adjacent to the two layers of the tape. Immediately after the heated plate is inserted in position, the clamping member 35 is lifted a little bit so that the other layer of the tape lightly contacts the lower surface of the heat plate 38. At this time, the two layers of the tape are thermally molten or fused at one side of each layer. After the lower surface of the upper layer (i.e., the leading end portion) and the upper surface of the lower layer of the tape 1 are thermally molten, the clamping member 35 is lowered and the heated plate 38 is then removed. Then, the clamping member 35 is lifted up again to make the thermally molten tape layers contact each other.

After the thermal welding is completed between the two layers of the tape as described above, the movable metal member 37 is removed from the path of the tape just like the heat plate 38 was, and the tape is cut with the cutter 39 so as to complete the packaging operation. The cut portion of the tape will become a new leading end of the tape for another packaging operation. The driving mechanism for the rollers 41, 42, clamping member 35, heat plate 38, etc. is not disclosed since the mechanism is known per se in the art and not the subject matter of the present invention.

According to the present invention, since the thermoplastic synthetic resin tape is treated with the embossment device to effectively disorder the micelle particle arrangement in the tape, no splitting or cracking will present in the lengthwise direction of the tape. Further, since the printings in desired manners or configuration is conducted before the embossing step in which the tape with printings thereon is provided with indentations on both surfaces thereof to effectively disorder the micelle particle arrangement, the printings cannot fade away particularly at the area of indented portions of the tape. Thus, the printed tape produced by the present invention complies with the requirement of the industry.

What I claim is:

1. Method for producing a thermoplastic synthetic resin tape for packaging wherein the tape is printed thereon, comprising the steps of forming a tape-like synthetic resin base, pressing said resin base to extend it to form a continuous tape, annealing the tape, printing predetermined letters or marks on one side of said tape directly by a pair of printing rollers one of which has printing legends on the rolling surface thereof, and embossing the printed tape to effectively disorder the micelle particle orientation in the tape, thereby forming indentations on the printed and unprinted surfaces thereof.

2. Method for producing a thermoplastic resin tape for packaging wherein the tape is printed thereon as claimed in claim 1, wherein the tape is cooled at below 20° C and then heated at about 95° – 100° C before the tape is pressed to be extended.

3. Method for producing a thermoplastic resin tape for packaging wherein the tape is printed thereon as claimed in claim 1, wherein said annealing is conducted at the temperature about 97° – 99° C.

4. Method for producing a thermoplastic resin tape for packaging wherein the tape is printed thereon as claimed in claim 1, wherein the tape is cooled at below 20° C after the tape is pressed to form indentations thereon.

5. Method for producing a thermoplastic synthetic resin tape for packaging wherein the tape is printed thereon, comprising the steps of forming a tape-like synthetic resin base, pressing said resin base into an extended continuous tape, annealing the tape, printing predetermined letters or marks on one side of said tape directly by a pair of printing rollers one of which has printing legends on the rolling surface thereof and embossing the printed tape by a pair of embossment rollers each of which has non-embossed portions at substantially regular intervals on the central portion of the rolling surface, the total area occupied by the non-embossed portion falling within the range of 10–50% of the entire effective rolling surface of said rollers, thereby forming a printed tape which has non-uniform thickness consisting of concave-convex portions except for areas of uniform thickness disposed in spaced relations along the entire length of said printed tape at substantially regular intervals on the central part of said printed tape.

* * * * *